(12) United States Patent
Makhoul et al.

(10) Patent No.: US 8,797,906 B2
(45) Date of Patent: *Aug. 5, 2014

(54) METHOD AND SYSTEM FOR WIRELESS MESSAGE-BASED ADVERTISING

(71) Applicant: Unomobi, Inc., Concord (CA)

(72) Inventors: Elie Makhoul, Mississauga (CA); Zia Khan, Markham (CA); Marvin Igelman, Thornhill (CA)

(73) Assignee: Unomobi, Inc., Concord, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,207

(22) Filed: Nov. 16, 2012

(65) Prior Publication Data

US 2013/0226701 A1    Aug. 29, 2013

Related U.S. Application Data

(63) Continuation of application No. 12/368,071, filed on Feb. 9, 2009, now Pat. No. 8,315,178.

(60) Provisional application No. 61/027,269, filed on Feb. 8, 2008.

(51) Int. Cl.
*H04W 4/00* (2009.01)

(52) U.S. Cl.
USPC ........ 370/252; 370/259; 370/313; 455/414.1; 455/456.3; 705/14.1; 705/14.4; 705/26.1; 725/32; 725/42

(58) Field of Classification Search
None
See application file for complete search history.

(56) References Cited

U.S. PATENT DOCUMENTS

| 5,649,300 | A | 7/1997 | Snyder et al. | 455/517 |
|---|---|---|---|---|
| 5,664,948 | A | 9/1997 | Dimitriadis et al. | 434/307 R |
| 5,754,933 | A | 5/1998 | Orndorff | 399/366 |

(Continued)

FOREIGN PATENT DOCUMENTS

| EP | 0 697 670 | 2/1996 | G06F 17/60 |
|---|---|---|---|
| EP | 0 853 287 | 7/1998 | G06F 17/30 |

(Continued)

OTHER PUBLICATIONS

Asthana, A. et al., "An Indoor Wireless System for Personalized Shopping Assistance," *IEEE*, pp. 69-74, Dec. 1994.

(Continued)

*Primary Examiner* — Chi Pham
*Assistant Examiner* — Shick Hom
(74) *Attorney, Agent, or Firm* — Sunstein Kann Murphy & Timbers LLP

(57) ABSTRACT

Systems and methods for message-based advertising in a wireless communications network are described. A digital message is contained in a data packet set in transit from a terminal of a sender to a terminal of a recipient. At least one of the terminals is implemented as a mobile telephone. The digital message is received through a network connection. A processor determines a context for the digital message and matches the message context to content of advertisements stored in an advertisement database in order to identify at least one relevant advertisement. The data packet set is transmitted to the terminal of the recipient. A processor retrieves the relevant advertisement(s) from the advertisement database and generates a confirmation message containing a delivery status of the data packet set. The confirmation message includes the relevant advertisement and is transmitted to the terminal of the sender.

14 Claims, 8 Drawing Sheets

(56) References Cited

U.S. PATENT DOCUMENTS

| | | | |
|---|---|---|---|
| 5,809,415 A | 9/1998 | Rossmann | 455/422.1 |
| 5,828,839 A | 10/1998 | Moncreiff | 395/200.34 |
| 5,852,775 A | 12/1998 | Hidary | 455/404 |
| 5,948,061 A | 9/1999 | Merriman et al. | 709/219 |
| 5,959,577 A | 9/1999 | Fan et al. | 342/357.13 |
| 5,991,735 A | 11/1999 | Gerace | 705/10 |
| 6,009,410 A | 12/1999 | LeMole et al. | 705/14.54 |
| 6,013,007 A | 1/2000 | Root et al. | 482/8 |
| 6,014,090 A | 1/2000 | Rosen et al. | 340/905 |
| 6,018,657 A | 1/2000 | Kennedy, III et al. | 455/426 |
| 6,018,724 A | 1/2000 | Arent | 705/44 |
| 6,047,327 A | 4/2000 | Tso et al. | 709/232 |
| 6,055,504 A | 4/2000 | Chou et al. | 705/1 |
| 6,055,513 A | 4/2000 | Katz et al. | 705/26 |
| 6,055,573 A | 4/2000 | Gardenswartz et al. | 709/224 |
| 6,070,083 A | 5/2000 | Watters et al. | 455/517 |
| 6,091,956 A | 7/2000 | Hollenberg | 455/456 |
| 6,101,486 A | 8/2000 | Roberts et al. | 705/27 |
| 6,115,754 A | 9/2000 | Landgren | 709/249 |
| 6,188,905 B1 | 2/2001 | Rudrapatna et al. | 455/452.2 |
| 6,199,045 B1 | 3/2001 | Giniger et al. | 705/1 |
| 6,208,866 B1 | 3/2001 | Rouhollahzadeh et al. | 455/456 |
| 6,237,145 B1 | 5/2001 | Narasimhan et al. | 725/23 |
| 6,317,718 B1 | 11/2001 | Fano | 705/1 |
| 6,324,650 B1 | 11/2001 | Ogilvie | 713/202 |
| 6,326,918 B1 | 12/2001 | Stewart | 342/457 |
| 6,332,127 B1 | 12/2001 | Bandera et al. | 705/14 |
| 6,360,167 B1 | 3/2002 | Millington et al. | 701/211 |
| 6,370,514 B1 | 4/2002 | Messner | 705/14 |
| 6,381,465 B1 | 4/2002 | Chern et al. | 455/466 |
| 6,385,591 B1 | 5/2002 | Mankoff | 705/14.26 |
| 6,393,471 B1 | 5/2002 | Kobata | 709/221 |
| 6,405,126 B1 | 6/2002 | Palomo et al. | 701/202 |
| 6,449,657 B2 | 9/2002 | Stanbach, Jr. et al. | 709/245 |
| 6,456,852 B2 | 9/2002 | Bar et al. | 455/456 |
| 6,505,046 B1 | 1/2003 | Baker | 455/456 |
| 6,505,168 B1 | 1/2003 | Rothman et al. | 705/10 |
| 6,510,418 B1 | 1/2003 | Case et al. | 705/26 |
| 6,522,875 B1 | 2/2003 | Dowling et al. | 455/414 |
| 6,523,064 B1 | 2/2003 | Akatsu et al. | 709/226 |
| 6,552,682 B1 | 4/2003 | Fan | 342/357.09 |
| 6,571,279 B1 | 5/2003 | Herz et al. | 709/217 |
| 6,581,099 B1 | 6/2003 | Deen et al. | 709/229 |
| 6,606,644 B1 | 8/2003 | Ford et al. | 709/203 |
| 6,608,556 B2 | 8/2003 | De Moerloose et al. | 340/501 |
| 6,615,183 B1 | 9/2003 | Kolls | 705/14.51 |
| 6,636,733 B1 | 10/2003 | Helferich | 455/412 |
| 6,636,896 B1 | 10/2003 | Philyaw | 709/238 |
| 6,647,257 B2 | 11/2003 | Owensby | 455/414.1 |
| 6,664,922 B1 | 12/2003 | Fan | 342/357.1 |
| 6,668,353 B1 | 12/2003 | Yurkovic | 715/205 |
| 6,677,894 B2 | 1/2004 | Sheynblat et al. | 342/357.1 |
| 6,754,485 B1 | 6/2004 | Obradovich et al. | 455/414.1 |
| 6,813,502 B2 | 11/2004 | Son et al. | 455/456.3 |
| 6,826,554 B2 | 11/2004 | Sone | 707/2 |
| 6,868,392 B1 | 3/2005 | Ogasawara | 705/26 |
| 6,889,054 B2 | 5/2005 | Himmel et al. | 455/456.3 |
| 6,912,398 B1 | 6/2005 | Domnitz | 455/461 |
| 6,922,672 B1 | 7/2005 | Hailpern et al. | 705/14.5 |
| 6,970,922 B1 | 11/2005 | Spector | 709/223 |
| 6,993,570 B1 | 1/2006 | Irani | 709/218 |
| 7,010,497 B1 | 3/2006 | Nyhan et al. | 705/14.44 |
| 7,020,685 B1 | 3/2006 | Chen et al. | 709/204 |
| 7,024,205 B1 | 4/2006 | Hose | 455/456 |
| 7,076,504 B1 | 7/2006 | Handel et al. | 705/14.39 |
| 7,093,286 B1 | 8/2006 | King | 726/12 |
| 7,155,198 B2 | 12/2006 | Kikinis et al. | 455/403 |
| 7,424,521 B1 | 9/2008 | Philyaw et al. | 709/219 |
| 7,426,480 B2 | 9/2008 | Granger et al. | 705/14 |
| 7,539,742 B2 | 5/2009 | Spector | 709/223 |
| 7,870,229 B2 | 1/2011 | Spector | 709/219 |
| 8,099,477 B2 | 1/2012 | Spector | 709/219 |
| 8,315,178 B2 * | 11/2012 | Makhoul et al. | 370/252 |
| 2001/0011264 A1 | 8/2001 | Kawasaki | 707/1 |
| 2001/0014868 A1 | 8/2001 | Herz et al. | 705/14 |
| 2002/0026360 A1 | 2/2002 | McGregor et al. | 705/14 |
| 2002/0026368 A1 | 2/2002 | Carter, III | 705/20 |
| 2002/0052781 A1 | 5/2002 | Aufricht et al. | 705/14 |
| 2002/0107737 A1 | 8/2002 | Kaneko et al. | 705/14 |
| 2002/0128903 A1 | 9/2002 | Kernahan | 705/14 |
| 2002/0184302 A1 | 12/2002 | Prueitt et al. | 709/203 |
| 2003/0036949 A1 * | 2/2003 | Kaddeche et al. | 705/14 |
| 2003/0083931 A1 | 5/2003 | Lang | 705/14 |
| 2003/0195801 A1 | 10/2003 | Takakura et al. | 705/14 |
| 2004/0158865 A1 | 8/2004 | Kubler et al. | 725/82 |
| 2005/0130685 A1 | 6/2005 | Jenkin | 455/466 |
| 2007/0244758 A1 | 10/2007 | Xie | 705/14 |
| 2007/0266101 A1 | 11/2007 | Patel et al. | 709/206 |
| 2008/0281661 A1 | 11/2008 | Young et al. | 705/8 |
| 2009/0017798 A1 * | 1/2009 | Pop | 455/414.1 |
| 2010/0312646 A1 * | 12/2010 | Gupta et al. | 705/14.58 |
| 2012/0089461 A1 * | 4/2012 | Greenspan | 705/14.58 |

FOREIGN PATENT DOCUMENTS

| | | | |
|---|---|---|---|
| EP | 1 271 908 A2 | 1/2003 | H04M 3/533 |
| JP | 6-317429 | 11/1994 | G01C 21/00 |
| WO | WO 93/04449 | 3/1993 | G07G 1/00 |
| WO | WO 94/27268 | 11/1994 | G09B 29/10 |
| WO | WO 99/04582 | 1/1999 | H04Q 7/22 |
| WO | WO 99/30257 | 6/1999 | G06F 17/60 |
| WO | WO 02/054803 A1 | 7/2002 | H04Q 7/22 |
| WO | WO 03/088690 A1 | 10/2003 | H04Q 7/22 |

OTHER PUBLICATIONS

Fano, A., "Shopper's Eye: Using Location-based Filtering for a Shopping Agent in the Physical World," *Proceedings of the Second International Conference on Autonomous Agents (Agents '98),* 6 pages, 1998.

Rosell, P. et al., "Mobile Position Related Services with Personalization," *Master's Thesis in Computer Science carried out at Telia Research AB in Luleå,* Sweden, Luleå Tekniska Universitet, 69 pages, Sep. 10, 1999.

* cited by examiner

US 8,797,906 B2

METHOD AND SYSTEM FOR WIRELESS MESSAGE-BASED ADVERTISING

The present application claims the benefit of U.S. Application Ser. No. 61/027,269, filed Feb. 8, 2008, which application is incorporated herein by reference in its entirety. This application is a continuation of U.S. patent application Ser. No. 12/368,071, filed Feb. 9, 2009, titled "Method and System for Wireless Message-Based Advertising" (now U.S. Pat. No. 8,315,178).

TECHNICAL FIELD

The present invention relates to message communication over wireless networks, and more particularly to advertising over wireless networks.

BACKGROUND ART

In the early 2000's, advertising to mobile phones evolved. The early advertising models broadcast advertisements to mobile users via short message service (SMS) ad campaigns. These models are based on application-to-peer ad delivery.

Some advertisers offer mobile users subsidized wireless communication in exchange for willingness to receive their ads. In this regard, recent US and international surveys have discovered that a main challenge for user adoption of mobile advertising is the intrusive nature of ad delivery.

To date, mobile advertising has been missing the main source of wireless data traffic; namely, the peer-to-peer market. Peer-to-peer communication accounts for more than 80% of SMS traffic, but this traffic is hidden from content providers and ad agencies. One of the constraints on the wider use of the SMS is the limit of 140 bytes worth of data. With a currently used GSM 03.38 alphabet set, supported by most SMS-centers (SMSCs) and SMS gateways and taking only 7-bit per character, 160 characters can be fitted into the length of the message. Typically, however, a large percentage of SMS messages include free, unused space within this standard size allotted for SMS.

Some prior art systems insert advertisements into peer-to-peer SMS messages, but this insertion takes place by interception of incoming messages at the signaling layer of the wireless communications network. However, interception of incoming messages at the signaling layer for insertion of advertisements has some drawbacks. Communication at the signaling layer is visible to service providers but is hidden from the content providers and ad agencies. Thus, advertisers have difficulty inserting ads into messages and subsidizing communications in exchange for ad placement. Also, intercepting messages at the signaling layer requires significant modification of the core network architecture and leads to redundant infrastructure as to existing messaging centers.

Additionally, many prior art systems insert advertisements into recipient outgoing messages in peer-to-peer communication. This method, however, also presents some drawbacks. While the objective of mobile advertisement is to subsidize part or all of the communication services cost by displaying ads to subscribers for using the services, in many prior art systems, the advertisement is delivered to the recipient instead of the sender who is the subscriber to the service. Such a method allows the advertiser to subsidize the receipt of the message, but often times, the charges for sending the message is greater than the charge for receipt, which is often times free.

Efficient coding and space allocation are of great importance in next generation wireless networks, which are expected to handle various types of highly demanding multimedia users. It would thus be beneficial to have a mobile advertising model that leverages the peer-to-peer communication traffic, increases its efficiency, and that provides a non-intrusive user experience.

SUMMARY OF THE INVENTION

Illustrative embodiments of the present invention are directed to message-based advertising in a wireless communications network. Illustrative embodiments of the method include receiving a digital message through a network connection. The digital message is contained in a data packet set in transit from a terminal of a sender to a terminal of a recipient. At least one of the terminals is implemented as a mobile telephone. A processor determines a context for the digital message and matches the message context to content of advertisements stored in an advertisement database in order to identify at least one relevant advertisement. The data packet set is transmitted to the terminal of the recipient. A processor retrieves the relevant advertisement(s) from the advertisement database and generates a confirmation message containing a delivery status of the data packet set. The confirmation message includes the relevant advertisement and is transmitted to the terminal of the sender.

A system for message-based advertising in a wireless communications network includes a first digital storage medium in which is stored an advertisement database. Each advertisement from the advertisement database is characterized by content. A receiver receives a digital message through a network connection. The digital message is intercepted while in transit from a terminal of a sender to a terminal of a recipient. At least one of the terminals is implemented as a mobile telephone. The digital message is contained in a data packet set. A context analyzer is configured to determine a context of the digital message and a rule engine matches the determined message context with content of advertisements stored in an advertisement database to identify at least one relevant advertisement. A database manager retrieves the at least one relevant advertisement from the advertisement database. A message generator generates a confirmation message containing a delivery status of the data packet set. The confirmation message includes the at least one relevant advertisement. A transmitter transmits the data packet set to the terminal of the recipient and the confirmation to the terminal of the sender.

In some or all of the above described embodiments, the network connection may be an IP network connection. Furthermore, the terminal of the sender and the terminal of the recipient may both be mobile telephones.

Some or all of the above described embodiments may use sender profiles. In some embodiments, the sender may subscribe for wireless message-based advertising. A database manager may retrieve a sender profile stored in a profile database. A rule engine may use the sender profile and the context for the digital message to identify at least one sender-relevant advertisement. The message generator may generate a confirmation message containing the delivery status of the data packet set and at least one sender-relevant advertisement. In illustrative embodiments, the confirmation message is responsive to a delivery request made by the sender and/or the confirmation message is an acknowledgment of receipt of the digital message.

Some or all of the above described embodiments may use recipient profiles. Recipients may be subscribers for wireless message-based advertising. A recipient profile may be stored in a profile database. A recipient profile and the context for the digital message may be used to identify the at least one recipient-relevant advertisement. A message transformer then inserts the least one recipient-relevant advertisement into the data packet set before it is transmitted to the recipient. In illustrative embodiments, the digital message may be transformed from one communications protocol to another and/or an audio clip, image, or video may be attached to the digital message.

Embodiments of the present invention apply to a variety of communication channels, including SMS, EMS, MMS, WAP Push protocol and such other channels. Embodiments of the present invention enable advertisers to offer people subsidized wireless communication in exchange for willingness to receive their message-based ads.

Illustrative embodiments of the present invention are also directed to methods and systems for message-based advertising where the digital message is transformed from one communications protocol to another. Illustrative embodiments of the method include receiving a digital message through a network connection. The digital message is intercepted while in transit from a terminal of a sender to a terminal of a recipient. At least one of the terminals is implemented as a mobile telephone. The digital message is contained in a data packet set having a first communications protocol. A processor is used to determine a context for the digital message and to match the determined message context with content of advertisements stored in an advertisement database in order to identify at least one relevant advertisement. At least one relevant advertisement is retrieved from the advertisement database. A processor inserts the relevant advertisement(s) into the data packet set and transforms the data packet set from the first communications protocol to a second communications protocol. The data packet set is then transmitted to the terminal of the recipient.

Illustrative embodiments of a system for message-based advertising where the digital message is transformed from one communications protocol to another include a first digital storage medium which stores an advertisement database. Each advertisement from the advertisement database is characterized by content. A receiver receives a digital message through a network connection. The digital message is intercepted in transit from a terminal of a sender to a terminal of a recipient. At least one of the terminals is implemented as a mobile telephone. The digital message is contained in a data packet set in a first communications protocol. A context analyzer determines a context of the digital message. A rule engine matches the determined message context with content of advertisements stored in an advertisement database in order to identify at least one relevant advertisement. A database manager retrieves the relevant advertisement(s) from the advertisement database. A message transformer inserts the relevant advertisement(s) into the data packet set to transform the data packet set from the first communications protocol to a second communications protocol. A transmitter then transmits the data packet set to the terminal of the recipient.

Some or all of the above described embodiments where the digital message is transformed from one communications protocol to another may use recipient profiles. In some or all of the above described embodiments, the recipients are subscribers to the wireless message-based advertising system. A second digital storage medium stores a profile database containing profiles of recipients. The database manager may be further configured to retrieve a recipient profile stored in the profile database. The rule engine may be use the recipient profile and the context for the digital message to identify the relevant advertisement(s).

In some or all of the above described embodiments where the digital message is transformed from one communications protocol to another, the network connection may be an IP network connection. Furthermore, the terminal of the sender and the terminal of the recipient may both be mobile telephones. Also, the data packet set may include a digital text message and the rule engine may be used to determine an amount of unused space in the data packet set.

In some or all of the above described embodiments where the digital message is transformed from one communications protocol to another, the first communications protocol may be an SMS protocol and the second communications protocol may be a concatenated SMS, EMS, MMS or WAP Push protocol. Also, when the message is transformed, an audio clip, image, or video may be attached to the data packet set.

Illustrative embodiments of the present invention also provide mobile telephone users with notification of e-mails. Such embodiments include fetching e-mails of the users. In the course of fetching, each e-mail targeted to multiple recipients is identified and fetching of any previously fetched e-mail targeted to multiple recipients is avoided. A notification of receipt of an e-mail is then sent to each user with respect to whom an e-mail has been fetched.

BRIEF DESCRIPTION OF THE DRAWINGS

The present invention will be more fully understood and appreciated from the following detailed description, taken in conjunction with the drawings in which.

DETAILED DESCRIPTION OF SPECIFIC EMBODIMENTS

The present invention relates to message-based advertising for peer-to-peer, application-to-peer, and peer-to-application messaging. Targeted ads are inserted within SMS and other such messages, by an advertising platform, and thus delivered to senders and recipients of messages. In some embodiments of the present invention, the targeted ads are inserted within unused space of the messages, and thus have negligible or no impact on network capacity.

Definitions. As used in this description and the accompanying claims, the following terms shall have the meanings indicated, unless the context otherwise requires:

An "ad" or "advertisement" refers to either a user-relevant advertisement or other information relevant to a user, a sender, or a recipient, of the wireless mobile communication services.

A "message" is a data packet set delivered peer-to-peer with the use of a wireless communication service. A "message", therefore, includes any data packet set processed by a mobile instant messaging service (such as IM, text messaging, SMS, concatenated SMS), an enhanced message service (EMS), a multi-media messaging service (MMS), or any other data packet set originating through the use of a textual wireless communication service, such as Email.

To "insert" data into a data packet set means to include the data in the data packet set, regardless whether by attachment as an appendix or as a connection or by placement directly within the data packet set itself.

A "mobile telephone" is a wireless transceiver for use in a wireless communication system, and the term includes devices, capable of wireless digital data communication, such as a cell phone or a smartphone.

Figure 1:
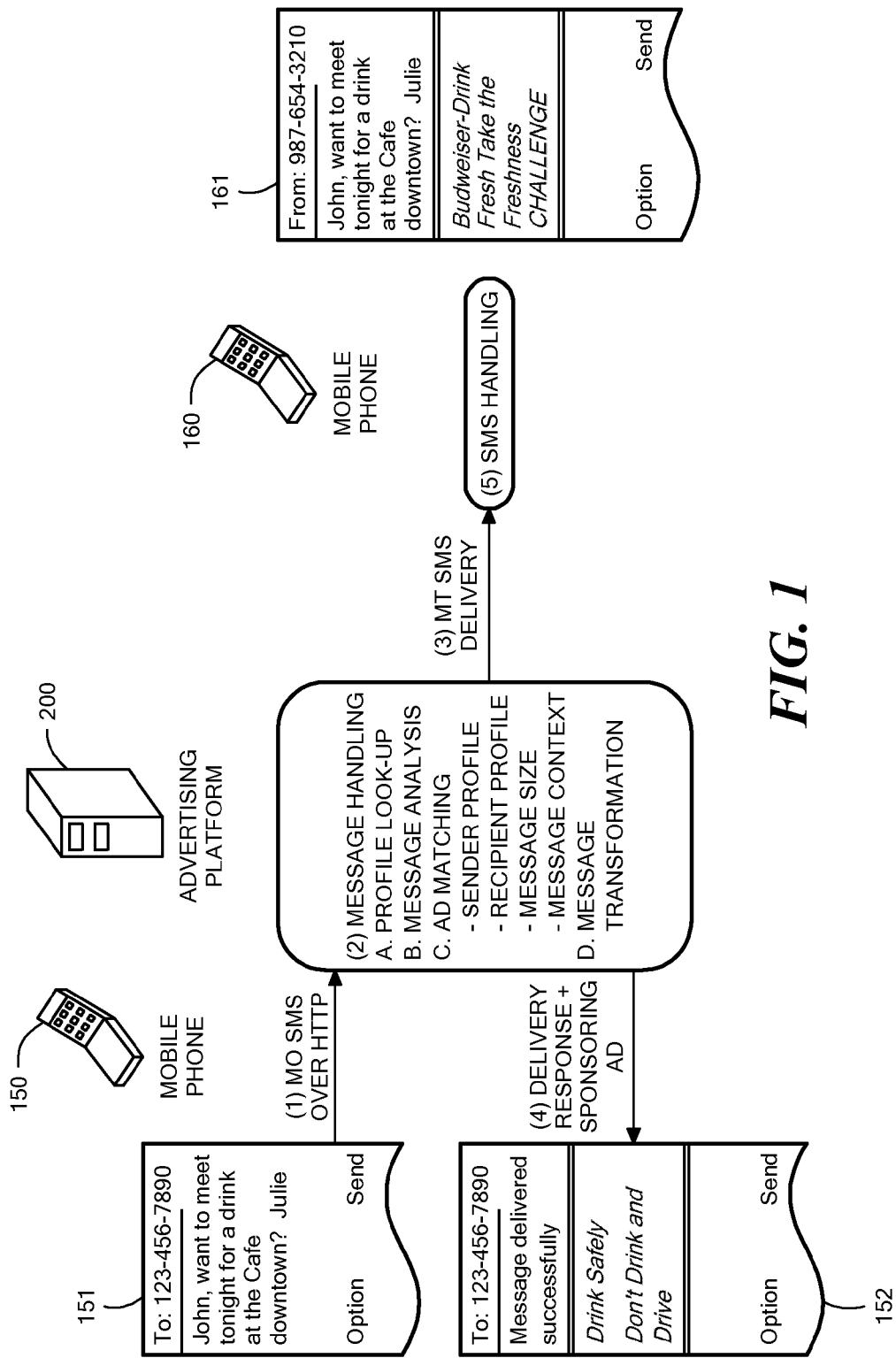
FIG. 1 is a simplified illustration of a mobile advertising workflow, in accordance with an embodiment of the present invention.

Reference is now made to FIG. 1, which provides an exemplary illustration of a mobile advertising workflow in accordance with an embodiment of the present invention. Shown in FIG. 1 are mobile phones 150 and 160, and an advertising platform 200. The advertising platform 200 may be embodied as a computer system having a processor and an associated digital storage medium. The sender and/or the recipient may be a subscriber for wireless message-based advertising with advertising platform 200. In specific embodiments, the subscribers to the wireless message-based advertising service may have an option of locally (de)activating by a user-defined input provided for the system through, for example, a mobile-phone user interface. As shown in FIG. 1, illustrative embodiments of the workflow may involves five stages.

At stage (1) a user of mobile phone 150, the sender, using subscriber client software installed in mobile phone 150, or native client available on the device (such as SMS client) issues a SEND SMS request, to send a mobile originated (MO) message 151 to a user of mobile phone 160, the recipient. The MO is not limited to an SMS, it may also be a concatenated SMS, EMS, MMS, or e-mail. In illustrative embodiments of the present invention, the message is sent to a pre-defined short code on the operator messaging center which the advertising platform 200 is registered to receive inbound SMS over an internet protocol (IP) network connection for example using an SMPP protocol. Alternatively, the subscriber client software in mobile phone 150 delivers the message to advertising platform 200 over an IP connection using the operator General Packet Radio Service (GPRS) network. By delivering the message to an advertising platform 200 over a network connection, such as an IP network connection, advertisers and content providers are provided with access to the message.

In general, the subscriber software installed in mobile phone 150 performs a variety of functions, including but not limited to:
  Subscription to advertising platform 200 via SMS and web/WAP.
  Personalization of a subscriber's service with respect to preferred ad channels and data-delivery options, as further discussed with reference to personalization service 552 of FIG. 4.
  Sending SMS messages to users.
  Replying to messages received from users.
  Wireless advertising of the platform 200.
  Redemption of ad campaign prices and coupons.
  Opting-out from service, as further discussed in reference to personalization service 552 of FIG. 4.

At stage (2), a computer program product used by advertising platform 200 receives an incoming message 151, from the subscriber's mobile phone 150, pushes the incoming message 151 into its processing queue, logs the transaction, and triggers a workflow process described by events A-D. Event A looks up personal profiles of the sender and the recipient. If the recipient is not a subscriber to advertising platform 200, then event A only looks up the personal profile of the sender.

Event B analyzes message 151 and classifies message 151 based on a message context, a message size, a current date & time, a priority level, and other parameters. For example, message 151 may be classified under "food and drink" based on the work "drink" appearing in message 151.

Event C queries a database or an advertising server computer for one or more relevant ads that match the sender's preferences and the context of incoming message 151. If the recipient is a subscriber to the advertising platform 200, then event C also queries the database or the advertising server computer for one or more relevant ads that match the recipient's preferences and the context of the message 151. In addition, in some embodiments of the invention, the queries are directed to ads that are small enough in size to fit within free, unused space allocated for the message 151. The found relevant ads may be further optionally ranked based on an ad content provider policy, and based on last occurrence of delivery of the ads to the sender or the recipient.

Event D transforms the message 151 to a transformed message 161, by inserting additional information—such as one or more ads that match the recipient's profile—in the body of the message. The transformed message 161 of FIG. 1 is shown to include an advertisement for Budweiser beer. In illustrative embodiments of the present invention, the message can be transformed from one communications protocol to another. For example, the advertising platform 200 may receive a message in SMS format, insert an advertisement, and then transform the message into concatenated SMS if the total message length exceeds 160 characters or standard maximum message length based on the supported encoding format. In some embodiments, the advertising platform 200 may receive a message in SMS format, transform the message into MMS format, which supports multimedia objects and, then insert an advertisement with an image, audio clip, or video into the message. The transformation of the message into a different communications protocol may be dependent on the type of protocol supported by the recipient's mobile phone 160 and/or service provider.

At stage (3) the advertising platform 200 delivers transformed message 161 to the operator network servicing the recipient, via a message aggregator or via direct connection to the operator messaging center. In turn, the operator network delivers the transformed message to the recipient.

At stage (4) the advertising platform 200 sends a confirmation message 152 to the sender. In specific embodiments such confirmation may be initiated by the sender's SEND SMS request. The confirmation message includes a delivery status and one or more ads that match the sender's profile. For example, the confirmation message may be responsive to a delivery request made by the sender or may be an acknowledgment of receipt of the digital message.

As seen in FIG. 1, confirmation message 152 includes a "Don't Drink and Drive" ad that corresponds to the contents of the incoming message 151. This confirmation message may be sent in any one of a SMS, concatenated SMS, EMS, MMS, WAP Push or e-mail format or simply a response to the send request via the available delivery bearer. The format of the confirmation message may be dependent on the type of protocol supported by the sender's mobile phone 150 and/or service provider.

At stage (5) the recipient is notified of the arrival of transformed message 161, either by the operating system of his mobile phone 160, or by subscriber client software within mobile phone 160. The recipient is then able to access the conventional SMS functions such as forward, save, and delete to process the arrived message further at his discretion.

As explained above, in illustrative embodiments of the present invention, the inserted ad may be sent to only the recipient. In some cases, the confirmation message with the inserted ad 152 may be sent to only the sender. Other times, an ad may be delivered to both the recipient and the sender through, respectively, the transformed message 161 and message confirmation 152. Whether or not an ad is sent to the recipient and/or the sender may be dependent on whether the recipient and/or the sender is a subscriber to the advertising platform 200.

In illustrative embodiments of the present invention, advertisers and content providers may subsidize wireless messaging using the advertising platform of the present invention. In return for receiving high-value targeted advertisements, subscribers (both senders and recipients) get free or subsidized messaging services (e.g., SMS, EMS, MMS, or e-mail services). Also, because of the relatively non-intrusive nature of the insertion, network operators may be able to maintain their existing network infrastructure without needing to increase network capacity.

Figure 2:
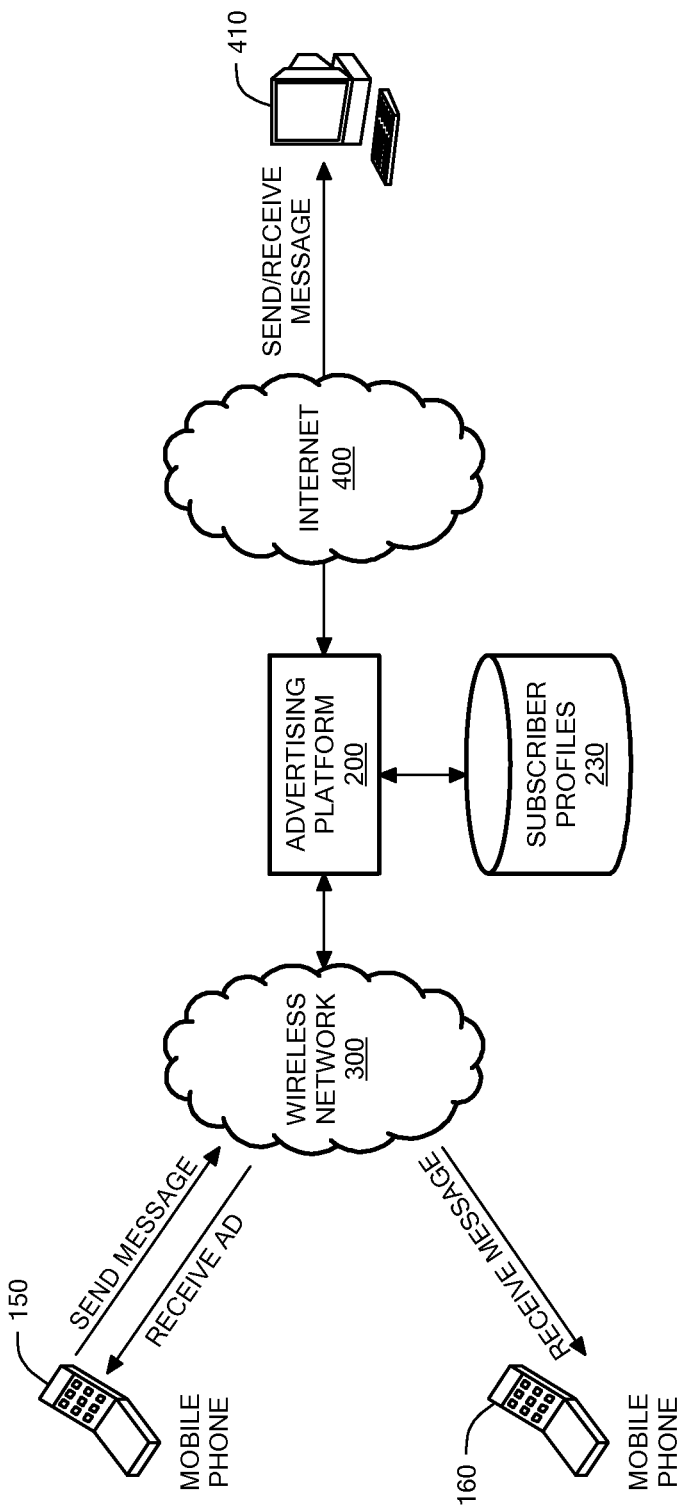
FIG. 2 is a simplified block diagram of a system for message-based advertising, in accordance with an embodiment of the present invention.

Reference is now made to FIG. 2, which is a simplified block diagram of a system for message-based advertising, in accordance with an embodiment of the present invention. Shown in FIG. 2 are the two mobile phones 150 and 160 connected to an operator wireless (e.g., GSM with GPRS) network 300, and a desktop computer 410 connected to Internet 400. The mobile phones 150, 160 and the desktop computer 410 are examples of user terminals. Also shown in FIG. 2 is an advertising platform 200 that accesses a database 230 of personal profiles for its subscribers. Database 230 includes personal subscriber information for each subscriber to the advertising platform 200. Subscriber profiles may include inter alia subscriber demographics, preferences, interests, hobbies and salary range.

As shown in FIG. 2, a user of a mobile phone 150, the sender, sends a message to a user of another mobile phone 160, the recipient, via a wireless network 300. The message is received while in transit by the advertising platform 200. The platform 200 is configured to insert one or more relevant ads into the incoming message to form an outgoing message that is transmitted to the recipient. As explained above, the advertising platform 200 may also transmit a confirmation message to the sender, the confirmation message includes a delivery status of the message and one or more relevant ads.

It will be appreciated from FIG. 2 that the platform 200 may be configured to serve a computer 410 as well as mobile phones 150 and 160. Such a configuration may utilize and be associated with, for example, a local termination model or an international termination model that are widely used by SMS gateway providers to facilitate the SMS traffic between businesses and mobile subscribers. Accordingly, a computer user may send or receive, over the wireless communication service, a data packet such as a text message. Similarly, the advertising platform 200 may be utilized as part of SMS-to-email services.

Figure 3:
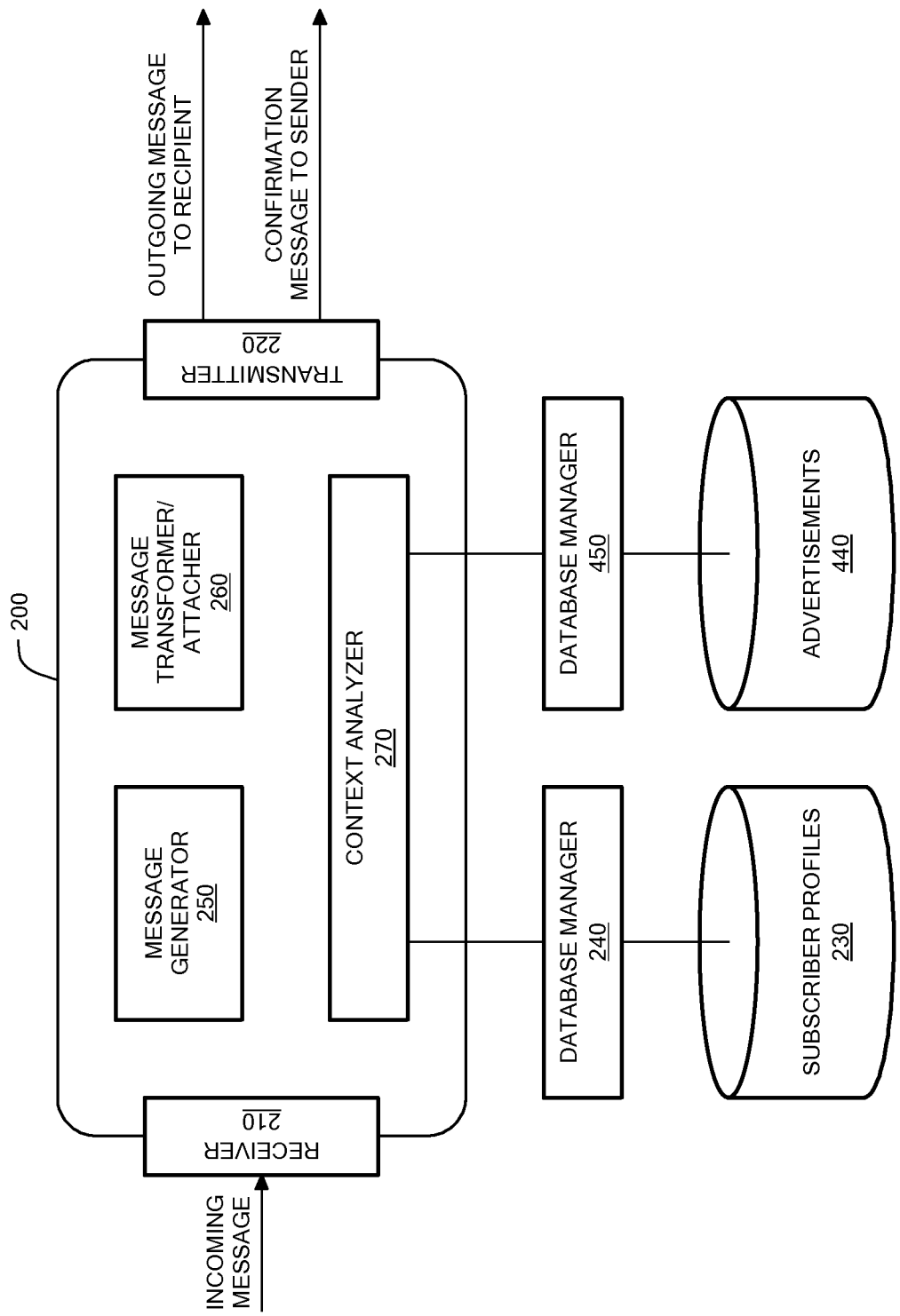
FIG. 3 is a simplified block diagram of the advertising platform 200 of the embodiment of FIG. 2.

FIG. 3 provides a simplified block diagram of the advertising platform 200, of the embodiment of FIG. 2. As shown, the advertising platform 200 includes a receiver 210, for receiving incoming data packets, such as message 151 of FIG. 1, and a transmitter 220 for transmitting outgoing data packets, such as messages 152 and 161.

The advertising platform 200 is additionally running computer processes to access personal profiles of its subscribers from the subscriber profiles database 230. Subscriber profiles include user preferences for each subscriber, which enable advertising platform 200 to identify ads that are relevant to a given subscriber. The subscriber profile may be updated in several ways. For example, in some embodiments, this information may be entered by the user through a website associated with the database 230. The subscriber may log-in to the website and select his favorite soft drink, sports franchise, or clothing retailer. A database manager 240 would then update the subscriber's profile. In other embodiments, the database manager 240 and advertising platform 200 dynamically develop the subscriber's profile by monitoring the user's behavior. The platform 200 may analyze the content of the subscriber's messages, to whom the messages are sent or received from, the time they send messages, and from where they send messages (e.g., geographic location). For example, if the subscriber mentions the Toronto Maple Leafs in multiple messages and he consistently sends messages from Montreal, the platform 200 may conclude that the subscriber spends time in Montreal and that the Maple Leafs are his favorite franchise. The platform 200 and database manager 240 may then update the user's profile to reflect that his location is Montreal and his favorite franchise is the Maple Leafs. The advertising platform 200 may then send the subscriber advertisements directed to Maple Leafs merchandise in the Montreal area. In such a manner, the information in the subscriber profiles is used by the advertising platform 200 to discover ads that are relevant to a given subscriber.

The advertising platform 200 is also running computer processes to access a database 440 of advertisements, via a database manager 450. The advertisements database 440 and the profile database 230 may be embodied in single or separate digital storage mediums associated with the computer system. Each ad in the database 440 is characterized by content such as keyword(s). The content of an ad is used to match the ad with a subscriber profile and/or the context of the incoming message, so that the ad is delivered to subscribers for whom it is relevant. For example, if the incoming message 151 says: "John, where do you want to go for drinks?", the advertising platform 200 could search for advertisements related to alcohol because the context of the message relates to drinking and the subscriber profile indicates that the subscriber's age is above the legal age for drinking alcohol. In this case, the advertising platform may insert an advertisement for Budweiser beer into the message.

The advertising platform 200 further includes a message generator 250, implemented as a computer process, for generating a confirmation for the sender. The confirmation may generally comprise a delivery status of the message that has been sent by the sender to the recipient or an immediate response as acknowledgment for receiving the incoming message from the sender, and one or more ads that are relevant to the sender. Various embodiments of the present invention may deliver the confirmation message 152 in a number of different protocols (e.g., HTTP Response, SMS, EMS, MMS, e-mail, and audio or video packet).

The platform 200 also includes a message transformer, or attacher, 260, also implemented as a computer process, that transforms an incoming message, such as the incoming message 151 of FIG. 1, to an outgoing message, such as message 161, by inserting, if desired, into the outgoing message 161 one or more ads that are relevant to the recipient. In some embodiments, the transformer 260 may also transform the incoming message 151 from one communications protocol to another. For example, the transformer 260 may insert a video advertisement into the incoming message 151 and transform the message into a multimedia message (MMS).

Furthermore, the advertising platform 200 may include a context analyzer, which derives the context of the incoming message 151. The context analyzer analyses the text of the incoming message. The analyzer looks for keywords in the text that are associated with a particular advertising category. For example, the advertising categories may include food, travel, and sports. There may be specific keywords that are associated with each category. The words "bar," "restaurant," "eat," "hungry," and "food" may be associated with the food category. Thus, if an incoming message 151 says: "Let's go eat, I am hungry", the context analyzer will find the key words "eat" and "hungry," and will know that the context of the message is food. The above described description is just one example of how a context analyzer works. Context analyzers that function differently and that are more sophisticated than the example described above are also within the scope of the present invention.

Figure 4:
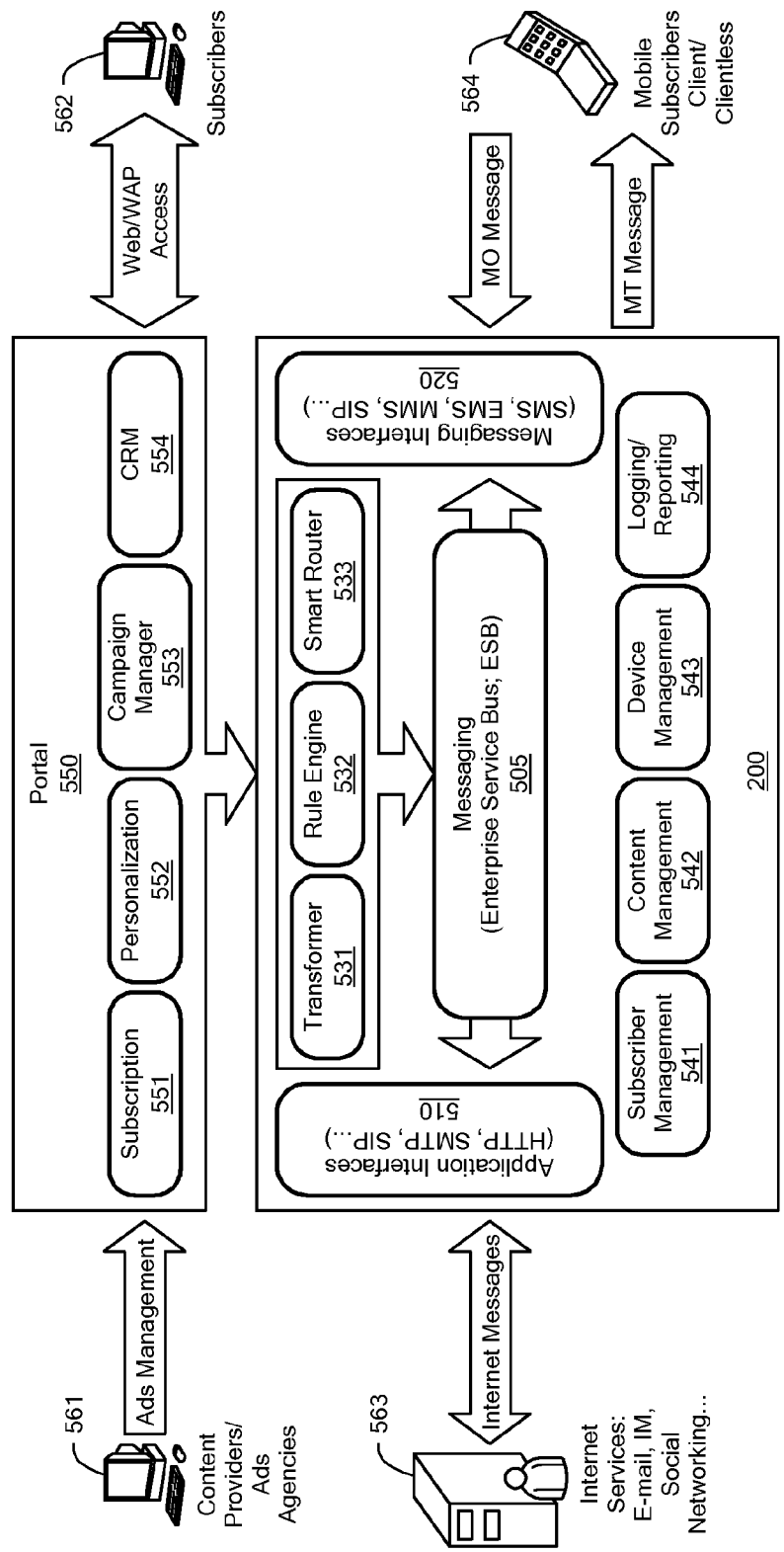
FIG. 4 provides further detail of the advertising platform 200 of FIG. 2 in an end-to-end implementation.

FIG. 4 provides further detail of an exemplary embodiment of the advertising platform 200 of FIG. 2 in an end-to-end implementation. The main components of the embodiment of FIG. 4 are the advertising platform 200 and a portal 550. The portal 550 is a Web/WAP based portal for bridging various external systems 561 through 564 that use the platform 200. The advertising platform 200 operates in conjunction with portal 550 in providing direct access to content providers and advertising agencies 561, subscribers 562, and administrators. In addition, the portal 550 exposes the content-management activities of campaign manager, and provides a simple workflow for managing the life cycles of advertisements. The portal 550 includes several modules; namely, a subscription module 551, a personalization module 552, a campaign manger module 553, and a customer relationship management (CRM) module 554.

The portal 550 and its several modules implement an access control list for role-based authentication, enabling assignment of different responsibilities to different user levels. An exemplary list follows.

Content providers and ad agencies:
   Provisioning of service and channel, including delivery workflow
   Content life cycle management including inter alia content provisioning, verification, publishing, maintenance and retirement
   Business intelligence reporting on different aspects of mobile ad delivery Subscribers:
   Self provisioning
   Service personalization
   Account management
   Ad interaction
   Ad archiving
   Ad redemption Administrator:
   Operation
   Administration
   Management
   Service life cycle management Generally, the advertising platform 200 includes common services with functions to deliver and trace ads using a broad spectrum of delivery channels including inter alia SMS, EMS, MMS, VOP, WAP Push, J2ME, BREW and mobile browsing. In the embodiment of FIG. 4, the platform 200 is shown as a J2EE-based enterprise class application, implemented using a distributed architecture for large scale deployment. The advertising platform 200 may be built using components-based architecture and utilize an enterprise service bus (ESB) 505 to facilitate asynchronous and synchronous communication between its various components.

Advertising platform 200 includes a Service Integration Framework for brokering requests and responses. The Service Integration Framework includes interfaces required for integration with network elements, and with external systems such as (i) content delivery systems, (ii) content provider and aggregator systems, (iii) messaging aggregators, and (iv) operator network systems for message delivery, rating and billing. The Service Integration Framework is based on the ESB architecture, which facilitates application and process integration by providing distributed processing, intelligent routing, security and dynamic data transformation.

As shown in FIG. 4, ESB 505 may be implemented as a distributed, heterogeneous infrastructure. The ESB 505 is used to manage the service infrastructure and to provide the capability to operate in a distributed heterogeneous environment. Furthermore, in some embodiments, the ESB 505 enhances the advertising platform 200 with an asynchronous message driven architecture.

The ESB 505 may include components and interfaces for binding to internal and external services. The ESB 505 enables both WebServices and transport binding for services such as e-mail, file system, and instant messaging, via standard service interfaces including but not limited to JavaMail, HTTP, WebDAV, FTP, CIFS, JMS, Jabber IM, and SOAP with attachment.

As shown in FIG. 4, the ESB 505 includes an event bus that, in some embodiments, supports synchronous and asynchronous delivery based on a store-and-forward model. The event bus delivers standard WebServices communication via WS notification, event management, distributed transaction, and reliable messaging. The event bus may also implement a normalized message broker for routing traffic for direct pass-through and through JMS.

The ESB 505 may provide several functions, including a transformer 531, a rule engine 532, and a smart router 533. A description of these various features follows.

Illustrative embodiments of the transformer 531 are configured to insert best matching ads in peer-to-peer, peer-to-application, and application-to-peer data packet sets. In addition, in some embodiments, the transformer 531 is capable of changing the format of the incoming message (or mapping one message format to another format or to a plurality of other formats) to accommodate for differences in formats and protocols adhered to by the variety of service providers associated with the sender and the recipient (e.g., transforming an SMS message into an EMS message).

The rule engine 532 is implemented to manage business logic for delivering ads to different segments of subscribers. For example, the rule engine may select, based on a predefined and dynamic set of rules, specific ads to be delivered to various subscribers. The embodiment of the engine 532 of FIG. 4 is shown to include a Business Process Orchestration component that creates custom workflows for content and service delivery. Embodiments of the rule engine of the invention are generally based on well-recognized industry standards such as Business Process Modeling Language and Business Processing Execution Language. By way of example only, the rule engine 532 may support the following default generic rules.

Rule I: Find ads with ad content that matches subscriber profiles, for specific channels and content providers.
   Rule II: Find ads based on message context by matching message keywords with subscriber profiles, for specific channels and content providers.

Rule III: Finds ads for subscribers based on their histories of ad delivery.

Rule IV: Prioritize matching ads based on content provider ratings.

In illustrative embodiments of the present invention, the rule engine 532 will find best matching ads based on the limits allowed by unused space within data packet sets. The rule engine 532 may be configured to determine space allocation of a data packet set containing the incoming message. The determination of space allocation may include, in specific embodiments, determination of unused space of the data packet not utilized by the sender and, therefore, available for use by the advertising platform 200 for inserting targeted ads to form an outgoing message to the recipient. For example, in the case of incoming text message, the rule engine 532 may determine the length of the message and, by subtracting the determined length from the overall length allotted to the message according to the used standard such as GSM 03.38, derive the amount of unused space in the incoming message 151. It would be understood, however, that in different contexts the unused space of the transmitted data packet set may not be a limiting factor for inserting a targeted advertisement. The content of the inserted targeted ad is based on the content of the incoming message and/or on the message-recipient's personal profile stored in database 230 if the recipient subscribes to the services provided by advertising platform 200. The derived context of the message is used by the rule engine 532 to query a database manager 450 for a matching ad stored in the database 440. If content of a given ad is found to match with the context of the incoming message and the recipient's profile, the rule engine 532 may consider the ad relevant and choose the ad for insertion within the incoming message to be further delivered to the recipient. As explained above, in some embodiments, such as SMS, insertion may be subject to the amount of unused space in the data packet set. The rule engine 532 may also use the content of the message to query database manager 450 to retrieve one or more ads from database 440 that are relevant to the sender and may be inserted within a confirmation message generated by message generator 250 to be returned to the sender.

Illustrative embodiments of the smart router 533 employ content-based routing for publisher models and subscriber models to enable end-point resolution and end-point selection, and to enable routing based on short codes, keywords, and sender and recipient profiles.

Illustrative embodiments of the advertising platform 200 may be open for developers, content providers, and operator systems by implementing a plurality of adaptors and interfaces such as:

Application interfaces 510, to provide access required for applications and services such as integration with community portals, as well content provider and publisher systems for receiving and retrieving ads from a plurality of content providers and delivering reports. Such access may be implemented through Java and web services programming interfaces.

Messaging interfaces 520, to support both push and pull models for sending and receiving messages over mobile operator networks, either directly or via messaging aggregator interfaces. These interfaces support a plurality of message types including inter alia SMS, EMS, MMS and WAP Push, and support a plurality of network protocols including inter alia HTTP, SMPP, PAP and MM7.

Various embodiments of the advertising platform of the invention may provide a variety of services. As shown in FIG. 4, for example, such services may include a subscriber management service 541, a content management component 542, a device management component 543, and a logging and reporting component 544. The portal modules 551, 552, 553, 554 discussed above may support all or some of these services and components.

A description of the abovementioned and various other services, components is provided below. Subscriber management service 541 manages accounts, devices, groups, service subscriptions, opt-ins and opt-outs, and their inter-relationships. Service 541 also manages associations between user devices and profiles, locales and time zones. Service 541 further manages hierarchical groupings of accounts, device profiles, and service profiles. Service 541 supports advanced personalization capability exposed to subscribers and advertisers via the portal 550. The personalization feature provides management of two aspects of subscriber accounts, as follows;

Opt-in / Opt-out for a specific advertisement channel (e.g., SMS, EMS, or e-mail).

Subscriber personalization of ad delivery, including inter alia (i) maximum number of ads to receive, and (ii) filters for specific ads. Service 541 enables subscribers to specify criteria of interest for ads, and to filter other types of ads (e.g., a subscriber can select "Sports Equipment" as criteria of interest, and filters for all other types).

Content management component 542 is responsible for managing the life cycle of content including inter alia (i) provisioning, (ii) verification, (iii) cataloguing, (iv) publishing, and (v) management. Illustrative embodiments of component 542 manage content based on a repository and registry governance model. Component 542 may also support auditing, to track and log activities related to content life cycle, thereby enabling report generation, access control and rollback. Component 542 also provide a content discovery capability by enabling immediate retrieval of ads based on various criteria provided during the content provisioning process. Component 542 enables discovery of ads based on context, demographics, user segmentation, time, and content metadata.

Device management component 543 is responsible for providing device registration, authentication, and authorization. Component 543 also provides device detection for enabling the transformer 531 to perform message transformation based on device capability. Component 543 provides an infrastructure to provision the subscriber client software to a subscriber's mobile phone 150 over-the-air, the provisioning including (i) client discovery, (ii) download, (iii) activation, (iv) upgrade, and (v) retirement. Component 543 may also include advanced security features such as device block, lock and wipe.

Logging and reporting component 544 provides a central logging module used by all services and components including the ESB 505, 531-533, 541-543. Component 544 enables logging of transactions, tracking of user interactions with ads, and reporting on user activities. Its reporting module generates different types of reports, for content providers to track and report on their ad delivery statistics. Component 544 can be integrated with third party reporting engines, to provide custom reports for ads and services. Information that may be tracked includes inter alia:

Number of impressions delivered per day.

Subscribers segment targeted by specific ads.

Interaction statistics for subscribers that interacted at least one with a specific ad, through messaging and opening of associated web links.

Market trend for user acceptance of ad formats and quality based subscribers.

Business intelligence for user profiles that interact with specific ads, including age, user device and geographic location.

Figure 5:
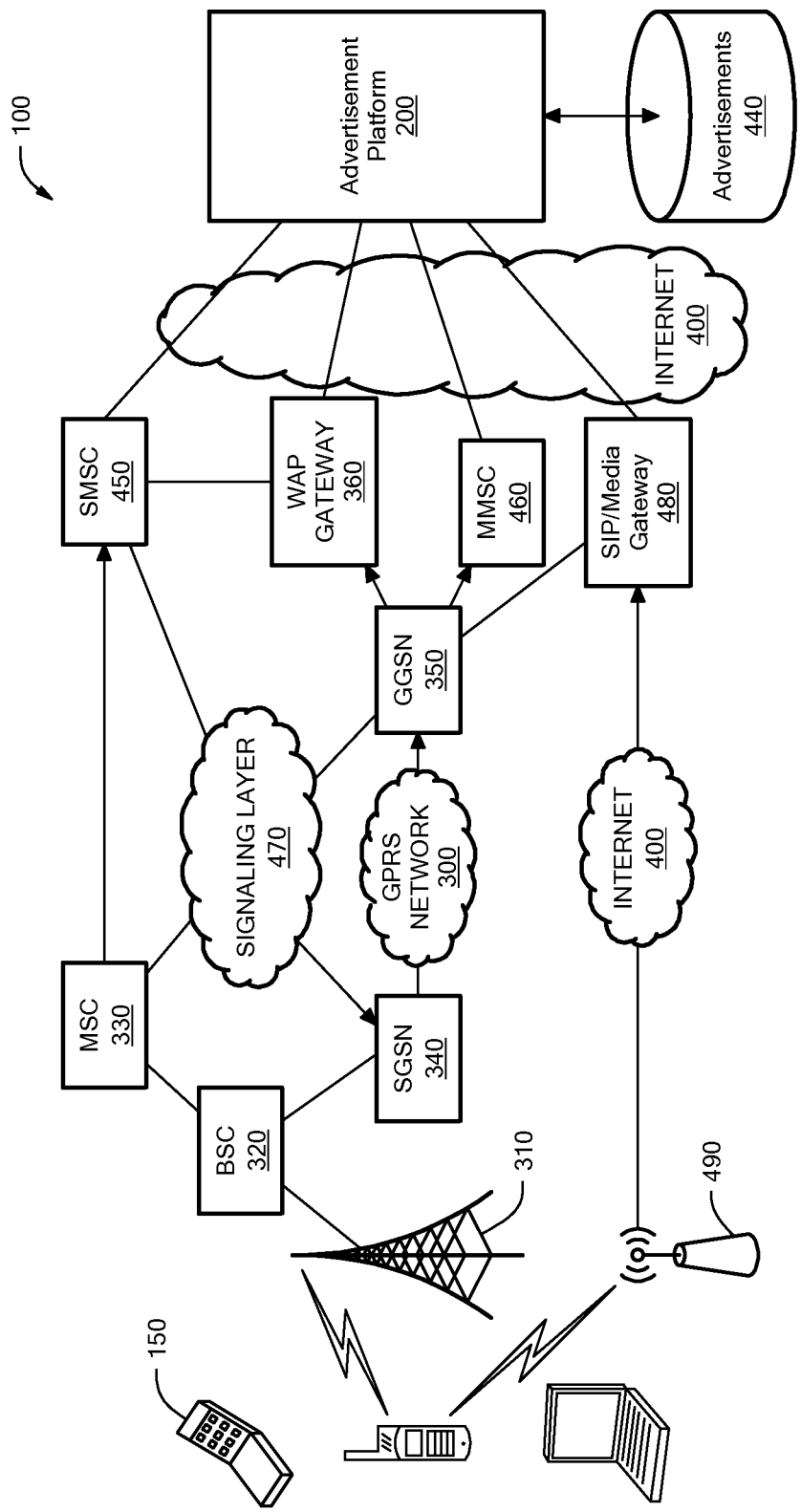
FIG. 5 depicts an exemplary wireless communication network, in which an embodiment of the present invention operates.

Reference is now made to FIG. 5, which is a simplified illustration of an exemplary wireless communication network 100 with mobile phone 150, in which an embodiment of the present invention operates. Shown in FIG. 5 is a wireless communications network 300. One example of a wireless network is a General Packet Radio Service (GPRS) network. GPRS is a packet-switched service for the Global System for Mobile Communications (GSM), similar to the Internet. GPRS provides packet radio access for mobile GSM users. GPRS also supports Wireless Application Protocol (WAP) services.

It will be appreciated by those skilled in the art that although wireless communication network 100 is described with reference to GPRS and GSM, the present invention applies to other current and future technologies, including inter alia packet-switched and circuit-switched technologies, and 3G technologies.

Mobile phones 150 communicate with base transceiver stations (BTS) 310 via an over-the-air interface. The BTS 310 is a component of wireless communication network 100 that terminate the over-the-air interface, over which subscriber traffic is communicated to and from mobile phones 150. The wireless communication network 100 typically includes a plurality of BSCs 320. Wireless communication network 100 also includes base station controllers (BSC) 320. BSCs 320 are switching modules that provide inter alia handoff functions and power level control in each BTS 310. BSCs 320 control the interface between a mobile switching center (MSC) 330 and BTS 310, and thus control one or more BTSs in call set-up functions, signaling, and use of radio channels. BSCs 320 also control the interfaces between Serving GPRS Support Nodes (SGSNs) 340 and BTSs 310.

SGSNs 340 service mobile phones 150 by sending or receiving packets via a base station subsystem (BSS), and more specifically via BSCs 320, in the context of GSM systems. SGSNs 340 are responsible for delivery of data packets to and from mobile phones 150, within a service area. SGSNs 340 also perform packet routing and transfer, mobility management, local link management, authentication and charging functions.

In the exemplary GPRS embodiment of FIG. 5, the local registers of SGSNs 340 store location information including inter alia the current cell and visiting location register (VLR) associated with mobile phones 150, as well as user profiles such as the International Mobile Subscriber Identify Number (IMSI) of all GPRS users registered with SGSNs 340, for example. While GSM forms the underlying technology, SGSNs 340 are network elements introduced through GPRS technology.

Another network element introduced in the GPRS context is the gateway GPRS support node (GGSN) 350, which acts as a gateway between the GPRS network 300 and other networks. In the embodiments shown in FIG. 5, the GGSN acts as a gateway between the GPRS network 350 and a WAP gateway 360. The WAP gateway 360 provide mobile phones 150 with access to Internet 400 and to advertising platform 200, respectively. In this manner, the advertising platform 200 has an IP network connection to the wireless communication network. In some embodiments, the advertising platform 200 may be embodied as server connected to the Internet 400, which is operated by ad agencies or content providers, or both. Advertising platform 430 accesses a database 440 of advertisements, for targeting ads to mobile phones 150, as described in detail hereinabove with reference to FIGS. 1-4.

WAP enhances the functionality of mobile phones 150 through a variety of real-time interactive wireless services over the Internet. WAP also allows content to be delivered over any bearer service, even when delivery of services is enabled over GPRS, 3G or any other such network. Application developers may use WAP to develop new services, and to adapt Internet applications for use with mobile phones 150. Applications may be written in Wireless Markup Language (WMP) and WMLScript (WMLS). The applications are stored on a proxy server or directly on WAP gateway 360, or both. Content stored on the proxy server is accessible from mobile phones 150 via GPRS network 110, GGSN 350 and WAP gateway 360.

Mobile phones 150 may access WAP-gateway 360 using a GSM-data call, where it supplies a user-agent field within a Wireless Session Protocol (WSP) header when fetching content from the proxy server. WAP gateway 360 encapsulates the WSP header within an HTTP header prior to forwarding to web server 420. The WSP header is used by web server 420 to inter alia determine the capabilities of mobile phones 150 and thereby deliver suitable content to mobile phones 150 by web server 420.

Advertising platform 200 may also have IP network connectivity to a short message service center (SMSC) 450 and/or a multimedia messaging service center (MMSC) 460. The SMSC 450 is a network element in the wireless communication network 100 which delivers SMS messages to and from mobile phones. The advertising platform 200 may communicate with the SMSC 450 using a number of different protocols such as SMPP, UCP, or CIMD. The MMSC 460 is a network element in the wireless communication network 100 which delivers MMS messages. The MMSC 460 is typically responsible for content adaptation of MMS messages. The advertising platform 200 may communicate with the MMSC 460 using, for example, an MM7 protocol.

The advertising platform 200 may also have IP network connectivity with a SIP/Media gateway 480 on the Internet 400. In this manner, using, for example, a session initial protocol (SIP), the advertising platform 200 will have access to multimedia services over the Internet 400 such as IM. The SIP/Media gateway 480 may also provide advertising platform 200 with access to the communications between the mobile phone 150 and a wireless internet connection 490, such as a WiFi network.

In illustrative embodiments of the present invention, the advertising platform 200 will be connected to an IP network connection. The IP network connectivity of the advertising platform 200 and its placement on the IP layer of the wireless communications network provide illustrative embodiments of the present invention with several advantageous, in distinction to prior art systems, which intercept messages at the signaling layer 470 using the SS7 protocol of the wireless communications network. Because of the platforms 200 placement on the IP layer, the advertising platform 200 (and its operating advertisers) may have access to message communication in the wireless communications network. This information is typically only accessible to network operators and service providers at the signaling layer. Placement at the IP layer also allows the advertising platform 200 to receive messages from a variety of different sources inter alia SMSCs, MMSCs, WAP gateways, and SIP/Media gateways. Furthermore, the IP network connection of the advertising platform 200 provides it with IP Multimedia subsystem (IMS) compatibility. In distinction to the illustrative embodiments of the present invention, the prior art systems insert advertisements into peer-to-peer SMS messages, but interception of incoming message takes place at the signaling layer of the wireless communications network.

Figure 6:
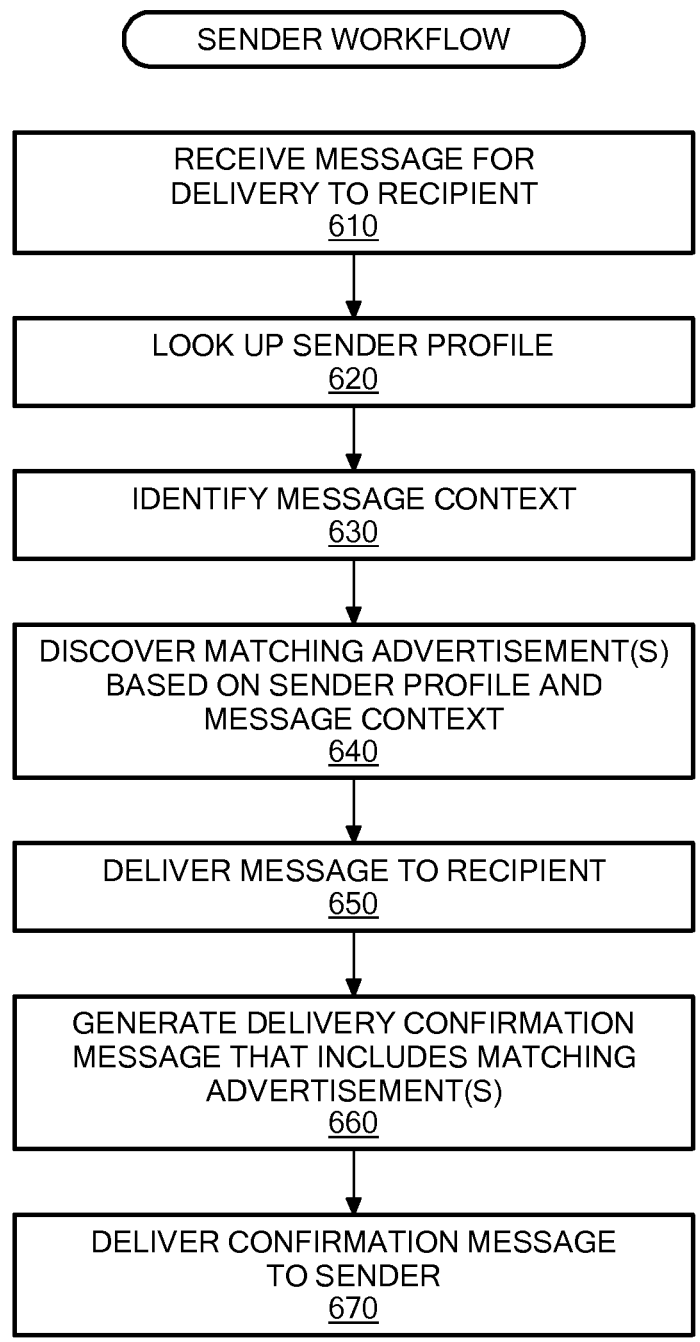
FIG. 6 is a simplified flow chart of a sender workflow for message-based advertising, in accordance with an embodiment of the present invention.

Reference is now made to FIG. 6, which is a simplified flow chart of a sender workflow for message-based advertising, in accordance with an embodiment of the present invention. The steps shown in FIG. 6 are performed by a message-based advertising system, such as advertising platform 200 of FIG. 3. At step 610, receiver 210 receives a message, such as message 151 of FIG. 1, from a sender for deliver to a recipient. For the case illustrated in FIG. 6, it is assumed that the sender is a subscriber of advertising platform 200, and the recipient is not a subscriber. At step 620, advertising platform 200 queries database manager 240 to look up the personal profile of the sender in subscriber profile database 230. At step 630, context analyzer 270 analyzes the message and derives a context thereof.

At step 640, advertising platform 200 queries database manager 450 to discover one or more ads in advertisement database 440 that match the sender profile identifier at step 620 and the message context identified at step 630. At step 650, transmitter 220 transmits the message to the recipient.

At step 660, message generator 250 generates a delivery confirmation message, such as message 152, which includes one or more of the ads discovered at step 640. Finally, at step 670, transmitter 220 transmits the confirmation message to the sender.

Figure 7:
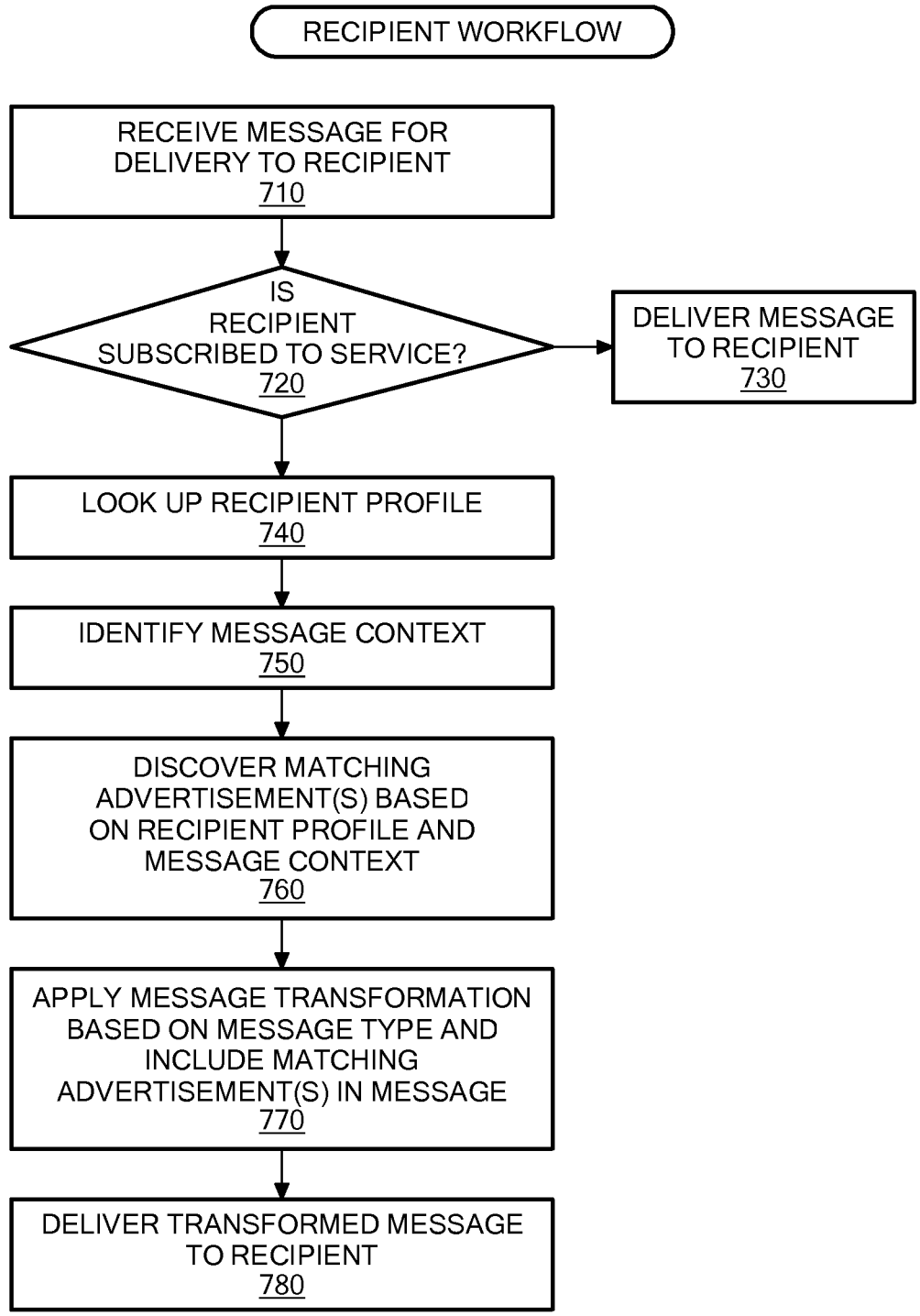
FIG. 7 is a simplified flow chart of a recipient workflow for message-based advertising, in accordance with an embodiment of the present invention.

Reference is now made to FIG. 7, which is a simplified flow chart of a recipient workflow for message-based advertising, in accordance with an embodiment of the present invention. The steps shown in FIG. 7 are performed by a message-based advertising system, such as advertising platform 200 of FIG. 3. At step 710, receiver 210 receives a message, such as message 151 of FIG. 1, from a sender for delivery to a recipient. At step 720 a determination is made whether or not the recipient is a subscriber to advertising platform 200. Such determination may be made by referencing subscriber profile database 230 to see if a profile exists for the recipient, or by any other manner of subscriber identification. If the recipient is not a subscriber then, at step 730, transmitter 220 sends the message as-is to the recipient.

If the recipient is a subscriber then, at step 740, advertising platform 200 queries database manager 240 to look up the personal profile of the recipient in subscriber profile database 230. At step 750, context analyzer 270 analyzes the message and derives a context thereof At step 760, advertising platform 200 queries database manager 450 to discover one or more ads in advertisement database 440 that match the recipient profile identifier at step 740 and the message context identified at step 750.

At step 770, message transformer/attacher 260 inserts one or more of the ads discovered at step 760 into the message, to generate a transformed message, such as message 161. Finally, at step 780, transmitter 220 transmits the transformed message to the recipient.

Figure 8:
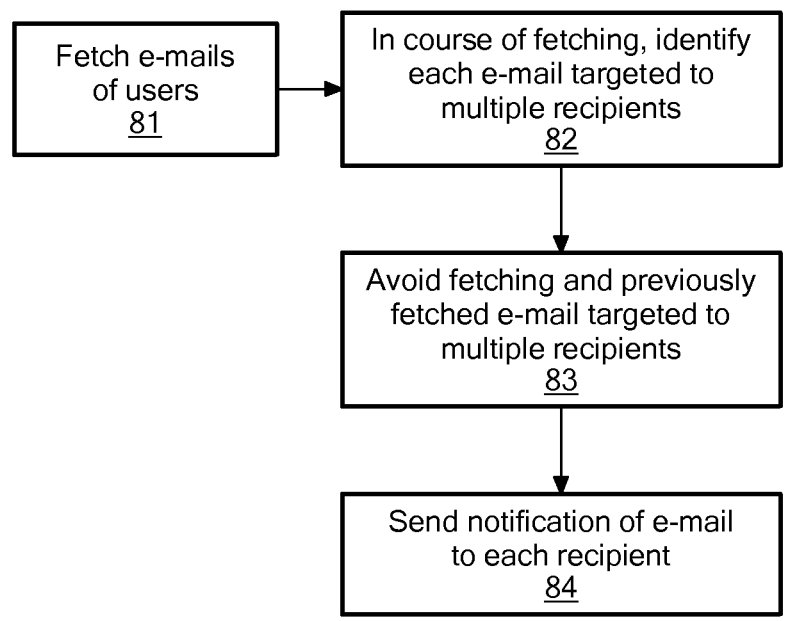
FIG. 8 is a block diagram of a flow chart showing processing steps for an e-mail conversion system in accordance with another embodiment of the present invention.

FIG. 8 is a block diagram of a flow chart showing processing steps for an e-mail conversion system in accordance with another embodiment of the present invention. This embodiment may be realized by incorporation of the processes described herein in the advertising platform 200 described previously. Alternatively, the processes may be implemented in lieu of the advertising insertion processes described previously. The processes herein enable efficient processing of e-mails delivered in protocols such as POP, IMAP or other Web based interfaces for push-based notifications to users in a format suitable for a mobile telephone, such as SMS, MMS, OMA-EMN or WAP Push. In process 81, a server fetches emails of multiple users using the relevant protocols of POP, IMAP or other Web based interfaces; previously each of the users shall have made available to the server in a secure manner the information such as e-mail service provider, user name, and password, so that the information can be used in the course of fetching. The e-mail service providers may include those operating, for example, gmail, yahoo, hotmail, or AOL.

The embodiment of FIG. 8 takes advantage of the fact that emails are often addressed to more than one individual. Ordinarily, and in prior art systems, where e-mails of many users are being handled, the same email would have to be fetched and cached more than once by the system—once for each recipient. In the present embodiment, in process 82, in the course of fetching, there is identified each e-mail targeted to multiple recipients. The purpose of this process is to avoid fetching any e-mail more than once. Consequently, the identified e-mail is used to prevent, in process 83, a second fetch. Such prevention may be accomplished by methods known in the art, such as making and caching a hash of the stored e-mail and using the hash to assist in identifying duplicates that need not be fetched. In process 84, the server causes the sending of notification of an e-mail to each recipient of an e-mail that has been fetched in process 81. Subsequently, upon notification, the user may operate the mobile telephone to retrieve further content of the e-mail as desired in a manner known in the art. Illustrative embodiments thus optimize the system scalability by reducing dramatically the load of the fetching module. Additionally, illustrative embodiments may save storage space for storing emails and their attachments because storing redundant copies is avoided.

Illustrative embodiments of the present invention may include the following advantageous:

Seamless client provisioning, service provisioning (opt-in / opt-out) and personalization through a web portal and mobile client interfaces.

Seamless delivery of ads using available delivery channels, including SMS, WAP Push, HTTP download, and HTTP streaming.

Service personalization for different features, including providers, keyword matching, and filtering for opted-in content channels.

Ad interaction including promotional campaign reply to short code and active links, content sharing and coupon redemption.

Portal for content providers and ad agencies to manage the life cycle of ad delivery, including ad provisioning and publishing, delivery workflow, policy management, and ad update and retirement.

Ad delivery, tracking and business intelligence, reporting on various types of information including number of impressions, service penetration, market segmentation, and service and ad interaction.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

In the foregoing specification, the invention has been described and illustrated with reference to specific exemplary embodiments thereof. It will, however, be evident that the specific exemplary embodiments are not intended to be limiting, and various modifications and changes may be made to these embodiments without departing from the broader spirit and scope of the invention as set forth in the appended claims. For example, a proposed method and system may be utilized in conjunction with virtually any messaging gateway, allowing for sending and receiving of messages to or from devices to provide wireless network connectivity among the parties and operating under a variety of standards, or combination thereof Embodiments of the invention can be incorporated into various corporate environments to enhance a company's communication capabilities and to realize various functions. By way of example only, embodiments of the advertising platform of the invention may be used with gateways that facilitate wireless data-packet traffic among various sending and receiving devices such as, for example, mobile phones, land-line phones, mail servers, and Email clients. The appliance functions, performed by devices participating in communication with the advertising platform of the invention may include, for example, databases, web-scripts (such as PHP, ASP, JSP or others), or computer Widgets (MAC X OS, Windows, Linux etc). For high-volume SMS traffic, the embodiments of the invention may be associated with IP SMS gateways known in the art, while the Skype clients may use services of the described platform through Skype SMS access. Accordingly, the specification and drawings are to be regarded in an illustrative rather than a restrictive sense.

What is claimed is:

1. An advertising platform comprising:
   a message receiver coupled to a mobile telephone communications network and configured to receive a peer-to-application message sent, via the mobile telephone communications network, by a subscriber client program executed by a mobile telephone of a sender, the message including information about a geographic location of the sender;
   a message context analyzer coupled to the message receiver and configured to automatically classify the received message based at least in part on the information about the geographic location of the sender, thereby yielding a message classification;
   an advertisement database configured to store a plurality of advertisements;
   a message generator coupled to the message context analyzer and the advertisement database and configured to automatically:
      select a relevant advertisement in the advertisement database, based at least in part on the message classification;
      retrieve the relevant advertisement from the advertisement database; and
      generate an electronic message that includes the retrieved relevant advertisement;
   a message transmitter coupled to the mobile telephone communications network and configured to transmit, via the mobile telephone communication network, the generated electronic message to the subscriber client program executed by the mobile telephone of the sender;
   a profile database configured to store a plurality of user profiles; and
   a profile database manager coupled to the profile database and to the message receiver and configured to automatically:
      analyze a plurality of messages sent via the mobile telephone communications network by the mobile telephone of the sender; and
      dynamically develop a profile of the sender in the profile database, based at least in part on the analysis of the plurality of the messages.

2. The advertising platform according to claim 1, wherein the message context analyzer is further configured to automatically classifying the received message based at least in part on contents of the received message.

3. The advertising platform according to claim 1, wherein:
   the profile database manager is configured to retrieve a profile of the sender from the profile database; and
   the message generator is coupled to the profile database manager and is further configured to automatically select the relevant advertisement in the advertisement database, based at least in part on the profile of the sender.

4. The advertising platform according to claim 1, wherein the profile database manager is configured to automatically analyze the plurality of messages by automatically analyzing contents of the messages.

5. The advertising platform according to claim 1, wherein the profile database manager is configured to automatically analyze the plurality of messages by automatically analyzing recipients of the messages.

6. The advertising platform according to claim 1, wherein the profile database manager is configured to automatically analyze the plurality of messages by automatically analyzing times at which the messages were sent.

7. The advertising platform according to claim 1, wherein the profile database manager is configured to automatically analyze the plurality of messages by automatically analyzing geographic locations from which the messages were sent.

8. A computer-implemented method for message-based advertising in a mobile telephone communications network, the method comprising:
  receiving, by an advertising platform, a peer-to-application message sent, via the mobile telephone communications network, by a subscriber client program executed by a mobile telephone of a sender, the message including information about a geographic location of the sender;
  automatically classifying the received message based at least in part on the information about the geographic location of the sender, thereby yielding a message classification;
  automatically selecting, based at least in part on the message classification, a relevant advertisement from a plurality of advertisements stored in an advertisement database;
  automatically retrieving the relevant advertisement from the advertisement database;
  automatically generating, by the advertising platform, an electronic message that includes the retrieved relevant advertisement;
  automatically transmitting, via the mobile telephone communication network, the generated electronic message to the subscriber client program executed by the mobile telephone of the sender,
  automatically analyzing a plurality of messages sent via the mobile telephone communications network by the mobile telephone of the sender; and
  dynamically developing a profile of the sender, based at least in part on the analysis of the plurality of the messages.

9. The method according to claim 8, wherein automatically classifying the received message comprises automatically classifying the received message based at least in part on contents of the message.

10. The method according to claim 8, further comprising:
  automatically retrieving a profile of the sender from a profile database; wherein:
  automatically selecting the relevant advertisement further comprises automatically selecting the relevant advertisement based at least in part on the profile of the sender.

11. The method according to claim 8, wherein automatically analyzing the plurality of messages comprises automatically analyzing contents of the messages.

12. The method according to claim 8, wherein automatically analyzing the plurality of messages comprises automatically analyzing recipients of the messages.

13. The method according to claim 8, wherein automatically analyzing the plurality of messages comprises automatically analyzing times at which the messages were sent.

14. The method according to claim 8, wherein automatically analyzing the plurality of messages comprises automatically analyzing geographic locations from which the messages were sent.

* * * * *